UNITED STATES PATENT OFFICE.

FRED A. JONES, OF LAKEWOOD, OHIO.

FURNACE-LINING MATERIAL AND THE PROCESS OF PRODUCING SAME.

1,251,535.  Specification of Letters Patent.  Patented Jan. 1, 1918.

No Drawing.  Application filed November 15, 1915. Serial No. 61,529.

*To all whom it may concern:*

Be it known that I, FRED A. JONES, a citizen of the United States, residing at Lakewood, in the county of Cuyahoga and State of Ohio, have invented a certain new and useful Improvement in Furnace-Lining Material and the Processes of Producing Same, of which the following is a full, clear, and exact description.

It is customary practice to repair the linings of open hearth furnaces and similar devices by using a suitably prepared calcined magnesite which, as is well known, is substantially magnesium oxid. This material being placed in the cracks and crevices and hollows of the walls and floor of the furnace, when the furnace is in cooled condition, will as the furnace is heated to proper temperature, become sufficiently plastic to amalgamate with the lining of the furnace.

The numerous demands for magnesite in the arts and the apparently limited supply of the material, have made the price of this material higher than is warranted to be paid when the material is used as a furnace lining repairing material, so that an efficient substitute of this material as a furnace lining repairing material would be both desirable and useful.

This invention is directed to the production of a material which may be used for magnesite in connection with repairing furnace linings and a process for producing the material just mentioned.

Generally speaking, the invention comprises the process and the product as set forth in the accompanying claims.

For the purpose of disclosing my invention I will describe the process and product produced from the treatment of dolomite.

As is well known, this mineral is a double carbonate of magnesium and calcium, which, when calcined, is reduced to magnesium and calcium oxids. Calcined dolomite is not a stable product, for the moisture of the atmosphere or other moisture will attack the material and the calcium oxid which forms a part thereof will slowly slake, which will cause the disintegration of the calcined dolomite to a substantially powdery mass, and so unfits it for such use as a repair material for a furnace lining, because the fine material would be carried out through the flues of the furnace as the furnace is heated.

It is therefore necessary to protect the calcined dolomite against weathering action, and this is accomplished by my invention.

The dolomite is first crushed in such a manner that the resulting product consists of granules or particles which will pass over a screen the mesh of which is one-eighth inch and pass through a screen the mesh of which is one-half inch. The dolomite when thus prepared is mixed with flue dust, which as its name indicates, is the dust obtained from the flues of blast furnaces or similar apparatus. This flue dust, while varying in composition, contains substantially the following elements, to-wit: very fine iron ore, fine coke dust and lime dust.

This flue dust is mixed with water to form paste in which condition it is thoroughly mixed with the crushed dolomite. The proportion in which the dolomite and flue dust are mixed may vary, but I have found an effective mixture to be substantially 90 per cent. of dolomite and 10 per cent. of flue dust.

After the crushed dolomite and flue dust are mixed they are placed in a rotary kiln in which the material is heated from 2000 degrees to 2500 degrees Fahrenheit, which is six or seven hundred degrees above the temperature at which calcium carbonate is calcined.

The result of this treatment will be that the dolomite will be completely calcined, and at the same time the flue dust will be fused and will adhere to the surface of the calcined dolomite granules. When this material has become cooled each of the particles will therefore be coated by a layer of flue dust. As a matter of fact the flue dust permeates each particle for a considerable distance below the surface but that result is incident to the treatment employed.

This layer of flue dust, being impervious, effectively prevents any weathering action of the calcined dolomite, but at the same time it does not in any way interfere with its action when used to repair a furnace lining.

In fact, this material will act in all respects, when used as a repair material for a furnace lining, the same as calcined magnesite will act.

As a modification of my invention, I will describe a slight differentiation of my process by which the material forming my invention may be produced.

The dolomite is first crushed until it is a powdery mass. The dolomite thus prepared is mixed with a wet paste of the flue dust as heretofore described. In its mixed condition it is placed within the rotary kiln and heated as before described.

The treatment of the material as thus described produces a material which is in all respects similar to the material produced by my first process, that is to say, it comprises a material in the form of small granules, each of which is composed of minute particles of calcined dolomite each coated with flue dust which protects the calcined dolomite from the weathering action.

In place of the flue dust, as before described, I may use talc, serpentine, clay or salt. Any one of these materials which may be used will, of course, be suitably prepared by grinding or otherwise bringing it into a finely divided condition. The material thus prepared will be made in the form of a wet paste in which condition it will be mixed with the dolomite in the same manner as described with respect to the flue dust.

I claim:

1. The herein described process, which consists in crushing a material containing magnesium oxid so that the particles will pass over a screen the mesh of which is one-eighth inch and through a screen the mesh of which is one-half inch, mixing said material with a substance which is unacted upon by moisture, and heating the mixture until the last mentioned material adhers to the surface of the particles of the material containing magnesium oxid.

2. The herein described process which consists in crushing dolomite to granular form, mixing the same with a material which when calcined will not be acted upon by moisture, employing a binding agent which is mixed with the foregoing materials, and agitating the mass so that each granule of the dolomite is coated with the aforesaid material, then heating the mixture until the dolomite is calcined.

3. The herein described process which consists in crushing dolomite to form granules, mixing the same with a wet paste containing furnace flue dust, and heating the mixture until the dolomite is calcined and the flue dust adheres to the surface of the granules of calcined dolomite.

In testimony whereof, I hereunto affix my signature.

FRED. A. JONES.